United States Patent [19]

Suwa et al.

[11] Patent Number: 5,655,070

[45] Date of Patent: Aug. 5, 1997

[54] POWER FAULT MONITORING CIRCUIT WITH MICROPROCESSOR RESET

[75] Inventors: Kazuyoshi Suwa; Masao Yokoyama, both of Oota, Japan

[73] Assignee: Sanyo Electric Co., Ltd., Oosaka-fu, Japan

[21] Appl. No.: 664,400

[22] Filed: Jun. 17, 1996

Related U.S. Application Data

[63] Continuation of Ser. No. 393,874, Feb. 24, 1995, abandoned.

[30] Foreign Application Priority Data

Feb. 28, 1994 [JP] Japan .................................... 6-054716

[51] Int. Cl.[6] .............................. G06F 11/30; G06F 11/00
[52] U.S. Cl. ..................... 395/182.2; 364/264.7; 361/90; 400/54
[58] Field of Search ............................. 395/182.2, 184.01, 395/650, 700, 750; 400/54, 74; 364/550, 570, 264.7, 266, 264.5; 324/500, 508, 72.5, 76.11, 76.39; 361/90, 93, 21; 340/825.16, 825.17

[56] References Cited

U.S. PATENT DOCUMENTS

| | | | |
|---|---|---|---|
| 4,750,040 | 6/1988 | Hakamada | 358/188 |
| 4,777,626 | 10/1988 | Matsushita et al. | 365/226 |
| 4,827,149 | 5/1989 | Yabe | 307/64 |
| 5,108,204 | 4/1992 | Suemune et al. | 318/434 |
| 5,163,025 | 11/1992 | Chamberlain | 365/226 |
| 5,408,648 | 4/1995 | Gokan et al. | 395/183.01 |

*Primary Examiner*—Hoa T. Nguyen
*Attorney, Agent, or Firm*—Darby & Darby

[57] ABSTRACT

According to the microprocessor malfunction operation preventing circuit of this invention, when the source voltage of a microprocessor is reduced to a prescribed voltage level between the value of a second source voltage (battery voltage) and the upper limit value of an operation unsteady region of the microprocessor, the microprocessor is enforcedly reset. Therefore, the microprocessor can be prevented from falling into its malfunction operation state, and the microprocessor can be freely actuated with any one of the main power source and the auxiliary power source.

3 Claims, 3 Drawing Sheets

POWER FAULT MONITORING CIRCUIT WITH MICROPROCESSOR RESET

This is a continuation of application Ser. No. 08/393,874, filed Feb. 24, 1995, now abandoned.

BACKGROUND OF THE INVENTION

1. Field of the Invention

This invention relates to a circuit for preventing malfunction operation (malfunction) of a microprocessor (called as "micon" or "microcomputer") which is installed in an air conditioner or the like, and particularly to a circuit for preventing malfunction operation (malfunction) occurring due to an operational unsteady region (malfunction operation region) for a source voltage, which each microprocessor itself has inherently.

2. Description of Related Art

In most of microprocessors which have been hitherto installed in air conditioners or the like, two power sources (main power source and auxiliary power source) are provided and jointly used. The main power source serves to perform a main operation such as a program operation, etc. for a microprocessor, and the auxiliary power source serves to perform an auxiliary operation such as a data holding operation which is required for a data backup owing to the stoppage of power supply (power-supply failure) or the like. In these microprocessors, the voltage of the main power source is set to a relatively large value (for example, 5 [V]) because power consumption due to the main operation is usually large, and the voltage of the auxiliary power source is set to a relatively small value (3 [V]) which is supplied from a battery (auxiliary power source or back-up power source) because power consumption due to the auxiliary operation is small.

When a microprocessor having a back-up power source as described above is actuated, the main operation is preferentially started at all times because the main operation has priority over the auxiliary operation for the following reason. That is, the microprocessor necessarily (inherently) has an unsteady region in a low voltage range (for example, a hatched area between V1 and V2 of a source voltage V of the microprocessor as shown in FIG. 1), which corresponds to a region where the microprocessor itself cannot make a judgment on "normal" or "abnormal" and thus there is a possibility that malfunction occurs (a main clock circuit cannot be actuated)), and a malfunction operation state (a malfunction state where no program can be started because no main clock waveform is generated) which would be caused due to the unsteady region when the voltage level of the power source is reduced must be avoided. Here, the source voltage of the microprocessor is defined as a driving voltage for the microprocessor which is equal to the voltage of the main power source at an ordinary operation time, and to the voltage of the auxiliary power source (back-up power source) at a backup operation time such as a power supply failure (stoppage) time. Therefore, in order to shift the operation of the microprocessor to the auxiliary operation based on a battery (backup power source) at the backup time, the operation must be temporarily shifted to the main operation simultaneously with the rise-up of the power source, and then shifted to the auxiliary operation, except for a case where the microprocessor has been already set to the main operation state. In order to avoid the microcomputer from falling into the unsteady region, a reset circuit as shown in FIG. 2 has been used.

The reset circuit as shown in FIG. 2 has a charge/discharge circuit comprising a resistor R and a capacitor C which is connected across ground and a main power source terminal of the microprocessor 1. The terminal $T_{54}$ is supplied with V=+5 {V} from the main power source. The middle (connect) point between the resistor R and the capacitor C is connected to a reset terminal RST of the microprocessor 1. The reset circuit further has a diode which is connected to the resistor R in parallel.

In the reset circuit thus constructed, the capacitor is charged by current supply through the resistor R, and thus the reset terminal RST of the microprocessor 1 is kept to a logically high level state. When the voltage of the main power source falls down due to a power supply failure or the like in the above state, the charges stored in the capacitor C are discharged from the capacitor through the diode D, and thus the reset terminal RST of the microprocessor 1 is set to a logically low level state to reset the microprocessor 1. That is, when the voltage of the main power source is reduced to a prescribed value or less, the microprocessor 1 is automatically reset to prevent the microprocessor from falling into the unsteady region (malfunction operation state).

However, the shift of the microprocessor into the unsteady region cannot be necessarily avoided by the reset circuit as described above. For example, when a backup switch for starting the auxiliary operation (a switch for supplying the battery voltage $V_{BT}=+3$ [V] to the microprocessor) is repetitively manipulated in the order of ON-OFF-ON with the main power source switched off because of a requirement on the operation of the microprocessor in a manufacturing process of an air conditioner or for a securing work of securing an air conditioner in a room or the like, in some cases the microprocessor falls into the malfunction operation state where the program cannot be started.

FIG. 3 shows time-variation of voltage values at the respective parts of the microprocessor, a "micon" source voltage $V_{DD}$ (solid line), a battery voltage $V_{BT}$ (one-dotted chain line), a reset terminal voltage $V_{RST}$ (two-dotted chain line) and a main clock oscillation voltage $V_{4.19}$ (4.19[MHz]: fine line) of the microprocessor, and variation of an operation mode to explain the occurrence of the malfunction operation as described above.

In FIG. 3, a power supply failure state (backup state; auxiliary operation) continues until t1, and then the backup switch is switched from on-state to off-state at t1. At t2 the backup switch is switched from off-state to on-state to set the microprocessor to the power supply failure state, and then at t3 the main power source (main switch) is switched on to set the microprocessor to a normal operation state. As is apparent from FIG. 3, if a period between the two power supply failure states (backup states) is long, the source voltage $V_{DD}$ of the microprocessor is liable to be reduced to a value within the unsteady region (i.e., the microprocessor is liable to fall into the unsteady region). Once the source voltage $V_{DD}$ of the microprocessor falls into the unsteady region, no oscillation waveform of clocks appears after t3 (see fine line $V_{4.19}$) even when the source voltage $V_{DD}$ is increased from the unsteady region to the power supply failure state and then to the normal operation state, so that the microprocessor falls into the malfunction operation state.

In order to avoid such a disadvantage has been proposed and known a switching circuit which is provided with the above sequence of "temporarily setting the operation of the microprocessor to the main operation when the power source rises up and then shifting it to the auxiliary operation" as a program, and performs a switching operation so that no backup voltage is output when the voltage of the main power source does not reach an initial voltage at which a switching portion operates.

However, the switching circuit having the sequence as described above must be designed in a large and complicated construction, and thus a manufacturing cost for the circuit rises up, so that a manufacturing cost for a target equipment such as an air conditioner to which the microprocessor is mounted, also rises up remarkably.

SUMMARY OF THE INVENTION

An object of the present invention is to provide a microprocessor malfunction operation preventing circuit with which a microprocessor can be surely prevented from falling into a malfunction operation state in a simple and low-price construction, so that the microprocessor can be freely actuated with any one of the voltages of main and auxiliary power sources.

In order to attain the above object, a microprocessor malfunction operation preventing circuit for preventing a microprocessor supplied with a first source voltage for a main operation and a second source voltage for an auxiliary operation from falling into a malfunction operation state due to reduction of a source voltage of the microprocessor, comprises reset means for enforcedly resetting the microprocessor when the value of the source voltage of the microprocessor is reduced to a prescribed voltage level which is set between the value of the second source voltage and the upper limit value of an operation unsteady region of the microprocessor.

In the microprocessor malfunction operation preventing circuit as described above, the second source voltage for the auxiliary operation may be the voltage of a battery for backup. Furthermore, the reset means may comprise a comparator for comparing the source voltage with the prescribed voltage level and outputting a reset signal to the microprocessor when the value of the source voltage is below the prescribed voltage level.

In the present invention, the source voltage of the microprocessor is equal to the second source voltage when the microprocessor is in an auxiliary operation mode (state) based on the second source voltage, and if the auxiliary operation is switched off in the above state, the second source voltage is extinguished and the source voltage is also reduced. When the source voltage is reduced to a prescribed voltage level, the microprocessor is enforcedly reset by the reset means. That is, the microprocessor is reset before the source voltage enters the unsteady region of the microprocessor (i.e., the microprocessor falls into the unsteady state). With this operation, the microprocessor can be actuated (started) by switching the microprocessor to any one of the auxiliary operation (backup) state and the main operation state, so that the malfunction operation (malfunction) state due to the unsteady region can be avoided. Furthermore, since the reset means may be constructed by the comparator, it may be designed in a simpler construction and at lower cost than a circuit in which a sequence must be beforehand programmed.

DETAILED DESCRIPTION OF THE PREFERRED EMBODIMENT

A preferred embodiment according to the present invention will be described hereunder with reference to the accompanying drawings.

Figure 1:
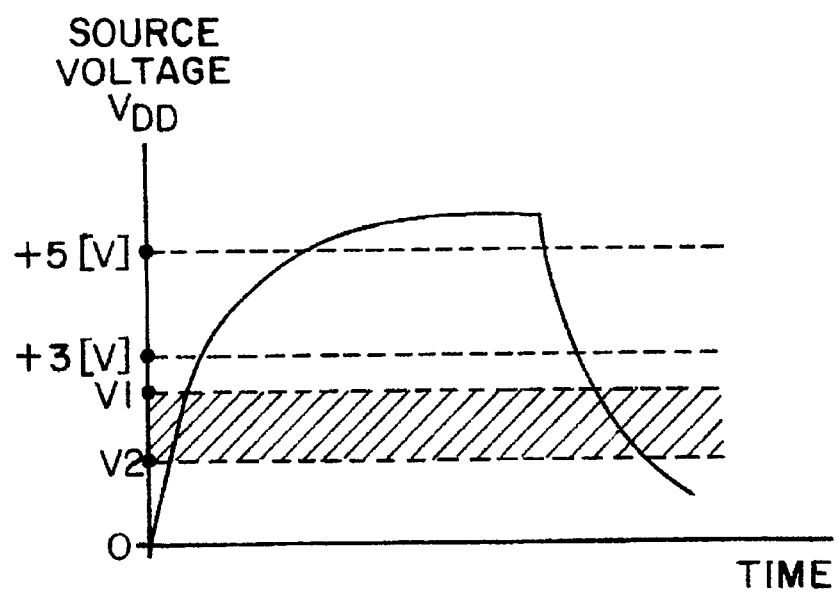
FIG. 1 is a diagram showing an unsteady region.
Figure 2:
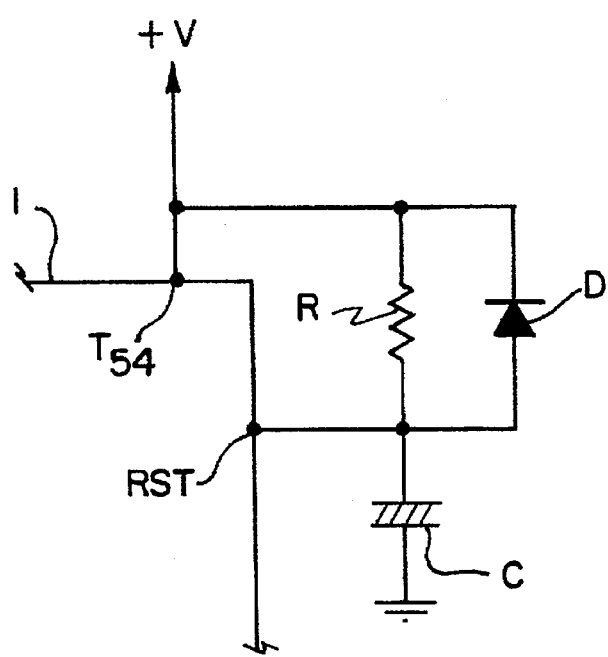
FIG. 2 is a circuit diagram showing a conventional reset circuit.
Figure 3:
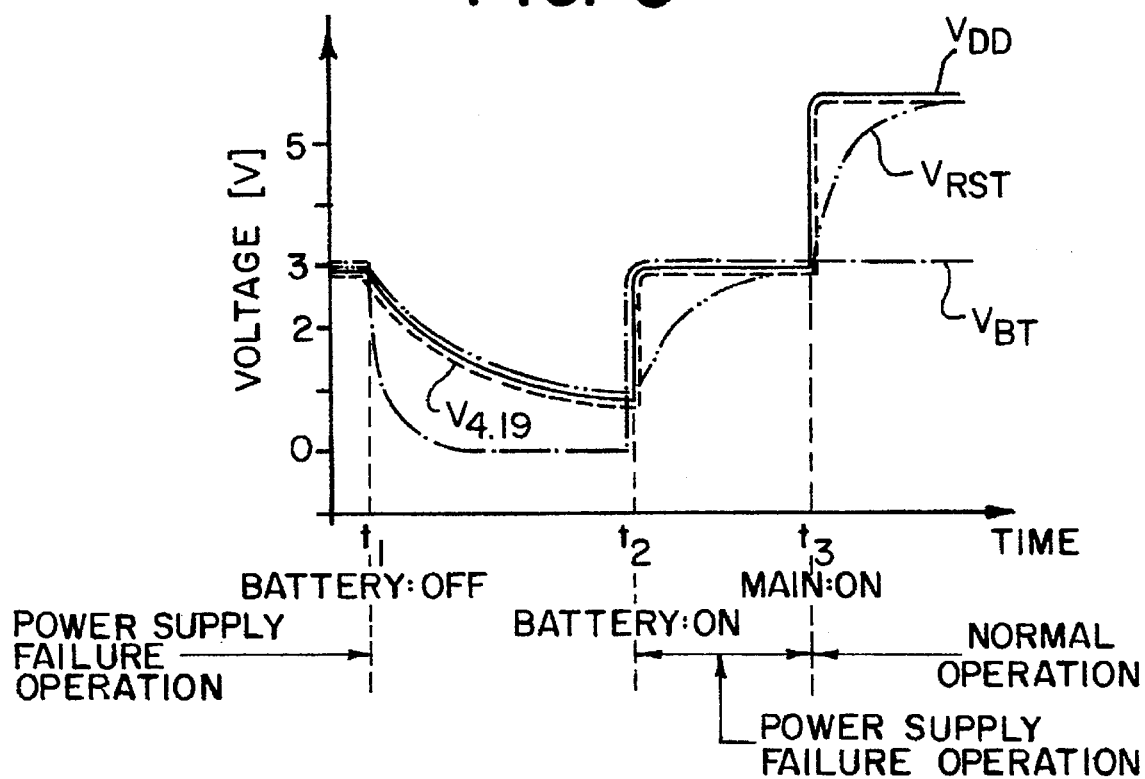
FIG. 3 is an operation diagram showing voltage variation at respective parts in a conventional microprocessor and a reset circuit thereof.
Figure 5:
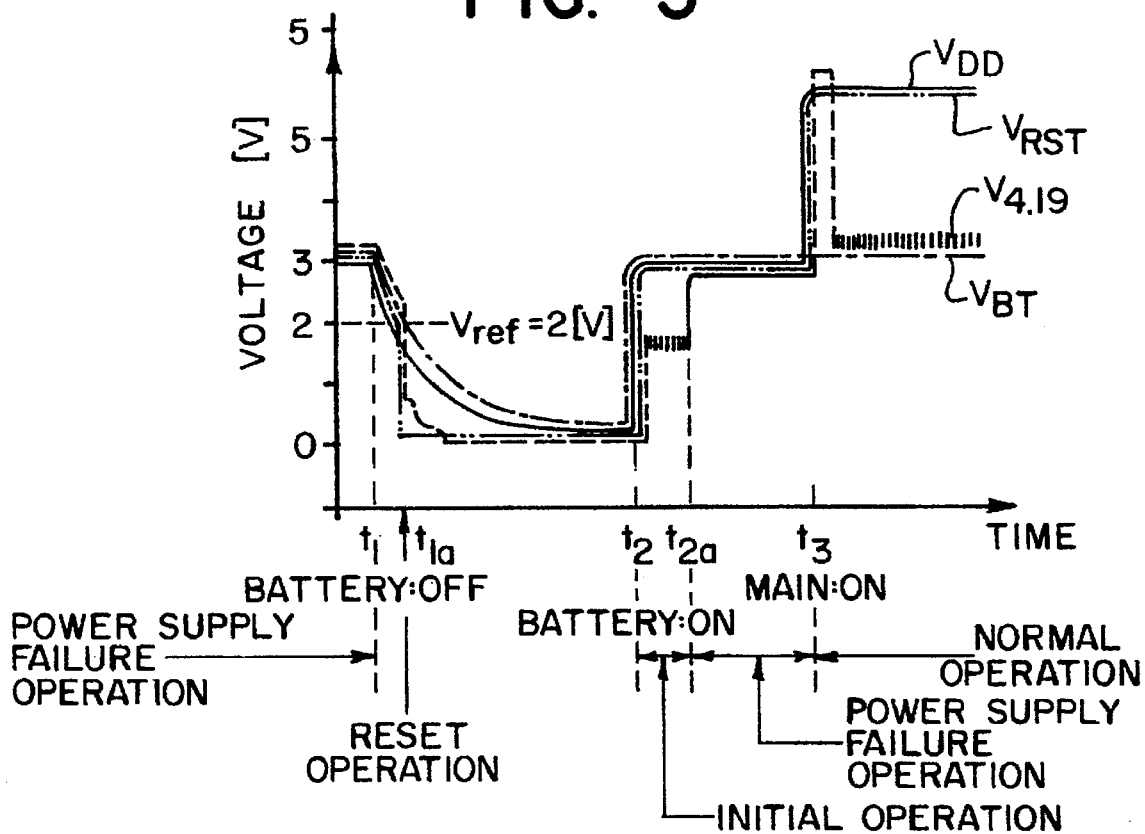
FIG. 5 is an operation diagram showing voltage variation at respective parts in the microprocessor according to an embodiment of the present invention.

A microprocessor and a malfunction operation preventing circuit therefor according to an embodiment of the present invention will be described with reference to FIGS. 4 and 5. The microprocessor of this embodiment is suitably used for a control circuit of an air conditioner. However, an equipment to which the microprocessor is applicable is not limited to the air conditioner, and it may be applied to any equipment insofar as it uses a microprocessor.

The microprocessor 10 which is equipped with the malfunction operation preventing circuit according to this invention is formed of a one-chip microcomputer which is designed as an integrated circuit (IC) (product model number μPD75316GF produced by NEC, for example), and it is operated in a two-power-source system having a main voltage source (+5 [V]) and an auxiliary voltage source (battery) (+3 [V]) as a source voltage $V_{DD}$.

Figure 4:
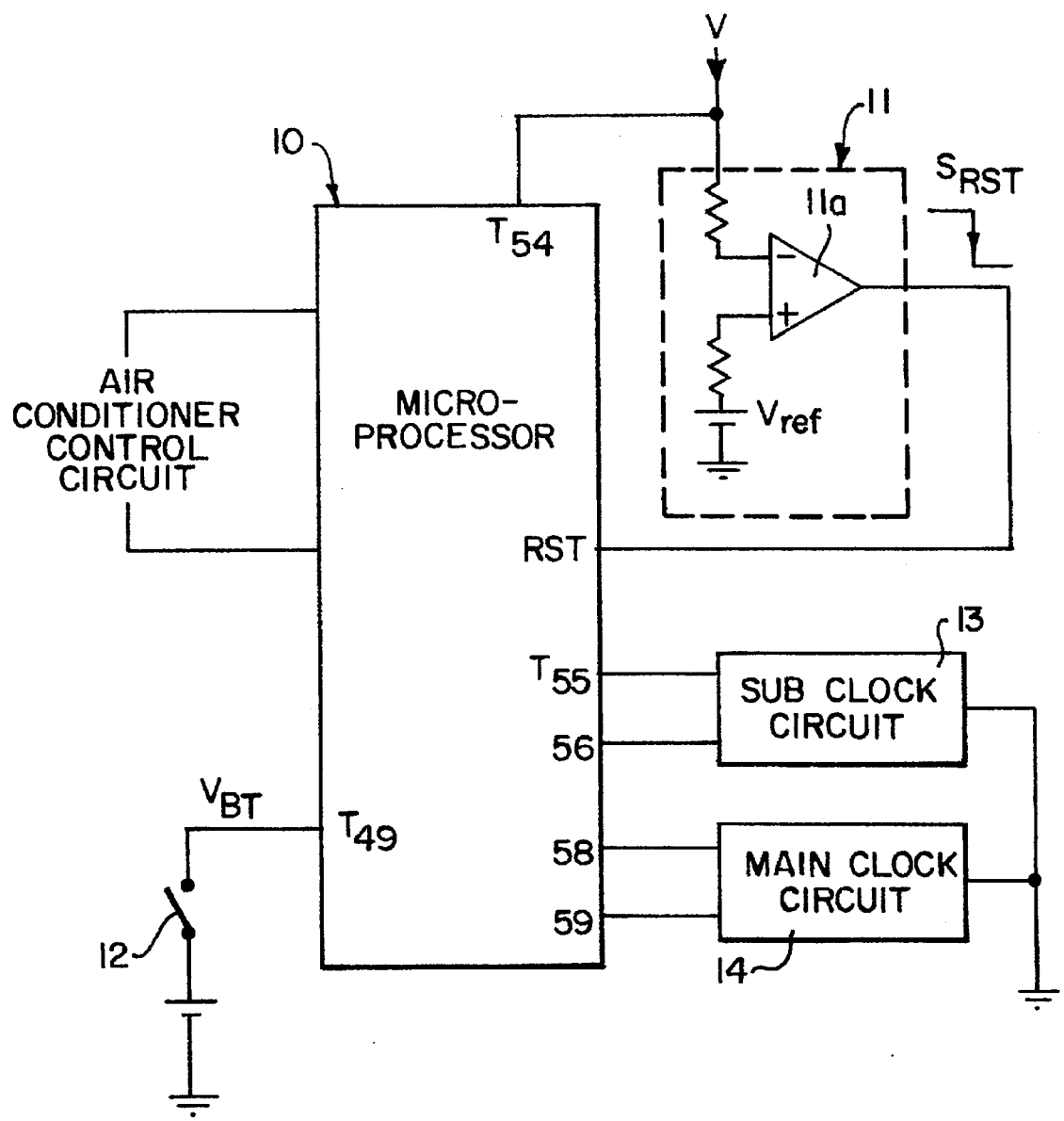
FIG. 4 is a block diagram showing a microprocessor and a malfunction operation preventing circuit therefor according to an embodiment of the present invention, which are mounted in an air conditioner.

The microprocessor 10 shown in FIG. 4 has various input/output terminals. The main power source terminal $T_{54}$ is supplied with a main voltage V=+5 [V] from a main power source circuit (not shown), and the main voltage V is also applied to an input terminal of a reset circuit 11 (constituting the reset means of this invention and also a main portion of the malfunction operation preventing circuit of this invention) for comparison with a reference voltage.

The reset circuit 11 shown in FIG. 4 is a CMOS type integrated circuit (IC) (product model number: S-80720AL-AH-X produced by Seiko Electric Company, for example), and it mainly comprises an active-low type comparator 11a. The main voltage V is applied to the inversion input terminal of the comparator 11a of the reset circuit 11, and the reference voltage $V_{ref}$ is applied to the non-inversion input terminal. Therefore, the output $S_{RST}$ of the comparator 11a is kept in a logically high state (H) while these voltage values satisfy the following inequality: $V > V_{ref}$. If V is reduced to a value which is equal to or less than $V_{ref}$, the output $S_{RST}$ of the comparator 11a instantaneously falls down and is set to a logically low state (L). The output $S_{RST}$ of the comparator 11a is supplied as a reset signal to the reset terminal RST of the microprocessor 10. The reference voltage $V_{ref}$ is set to a predetermined value (for example, 2 [V]) which is larger than the upper limit value (for example, 1.574 [V]) of an unsteady region (from 1.574 [V] to 0.2 [V]) of the microprocessor 10. Here, $V_{DD}$ represents the source voltage of the microprocessor, and it corresponds to the battery voltage $V_{BT}$ in the power supply failure state (backup operation state) and to the main voltage V in the normal operation state.

A power-supply failure detection input terminal $T_{49}$ of the microprocessor 10 is connected through a backup switch 12 to a battery BT serving as an auxiliary power source for backup, so that the battery voltage $V_{BT}$=+3 [V] can be applied to the microprocessor 10. If the power supply failure (stoppage) occurs, the backup switch 12 is automatically switched on and the battery voltage $V_{BT}$=+3 [V] is applied to the microprocessor 10 to perform the auxiliary operation such as the data holding operation, etc.

Furthermore, clock terminals $T_{55}$ and $T_{56}$ of the microprocessor 10 are connected to a sub clock circuit 13 which is actuated at the backup time such as the power supply failure time or the like, and other clock terminals $T_{58}$ and $T_{59}$ of the microprocessor 10 are connected to a main clock circuit 14 which is actuated at the normal operation time. The sub clock circuit 13 serves to generate a low-frequency clock pulse of 32 kHz and the main clock circuit 14 serves to generate a high-frequency clock pulse of 4.19 MHz. The other input/output terminals of the microprocessor 10 are connected to the other circuit parts of the control circuit for the air conditioner.

Next, the actuating operation of the microprocessor 10 will be described with reference to FIG. 5.

Now, it is assumed that the microprocessor 10 is in the power supply failure (backup operation) state. In this state, the reset has not yet been made, and the main voltage V=0 {V} and the battery voltage $V_{BT}$=3 [V] (see one-dotted chain line in FIG. 5) are applied to the microprocessor 10. Therefore, all of the source voltage $V_{DD}$ (solid line), the reset terminal voltage $V_{RST}$ (two-dotted chain line) and the main clock oscillation voltage $V_{4.19}$ (fine line) of the microprocessor 10 are kept to 3 [V] as show in FIG. 5.

At this time, when the backup switch 12 is switched off at t1, the battery BT is separated from the microprocessor 10 and thus the voltage value at each part of the microprocessor 10 is gradually lowered. Thereafter, when the source voltage $V_{DD}$ is equal to the reference voltage Vref (2 [V] in this embodiment) at $t_{1a}$, the output $S_{RST}$ of the comparator 11a of the reset circuit 11 falls down, so that its logic state is changed from a logic H level to a logic L level. The variation in logic level of the output $S_{RST}$ of the comparator 11a is supplied as a reset signal to the microprocessor 10, and in response to the reset signal the microprocessor 10 is enforcedly reset. That is, the microprocessor 10 is surely reset before the source voltage $V_{DD}$ thereof enters the unsteady region (from 1.574 [V] to 0.2 [V] in this embodiment).

Thereafter, when the backup switch 12 is switched on at t2 again, all of the source voltage $V_{DD}$, the battery voltage $V_{BT}$ and the reset terminal voltage $V_{RST}$ rise up to 3 [V]. At this time, the main clock oscillation voltage $V_{4.19}$ oscillates and thus the oscillation waveform thereof appears as shown in FIG. 5. When this oscillation is finished at $t_{2a}$, the main clock oscillation voltage $V_{4.19}$ is also set to 3 [V] to which the source voltage $V_{DD}$ and the battery voltage has been already set.

Thereafter, a main switch (not shown) is switched on at t3 to supply the voltage of the main power source V to the microprocessor 10, so that the source voltage $V_{DD}$ and the reset terminal voltage $V_{RST}$ of the microprocessor 10 are set to the main voltage V=5 [V]. At this time, the main clock oscillation voltage $V_{4.19}$ temporarily follows the rise-up of the source voltage $V_{DD}$, however, it falls down readily and then the oscillation waveform at the normal operation time appears. With this oscillation waveform, the program is started and the microprocessor operates normally.

With this construction, the microprocessor can be started (actuated) with any one of the main power source and the auxiliary power source (battery voltage), and thus no priority must be established between these power sources to rise up the microprocessor. Accordingly, even when the backup switch is repetitively manipulated in the order of ON-OFF-ON with the main power source switched off to secure an air conditioner in a room, the reset operation can be surely performed at a suitable timing which is conformable to the reduction of the source voltage of the microprocessor, so that no malfunction (malfunction operation) occurs in the microprocessor. Accordingly, air conditioners having the microprocessors thus constructed can be shipped from a factory with the auxiliary power source (battery) thereof switched on, and the malfunction in the securing work can be prevented. In addition, no special attention is required to be paid to the manipulation of the backup switch in the securing work, and thus the securing work can be efficiently performed.

Furthermore, since the data backup operation can be performed in the microprocessor, a data reset operation is not required at the restore time from a power-off state, so that its convenience for an user is improved. In addition, previous alarm data at a service time can be held, and thus maintenance is excellent.

On the other hand, the reset circuit of this embodiment needs no complicated sequence circuit, and it may be constructed by a comparator which is low in price, so that the total manufacturing cost of an equipment having the microprocessor of this invention can be lowered.

As described above, according to the microprocessor malfunction operation preventing circuit of this invention, when the source voltage of the microprocessor is reduced to a prescribed voltage level between the value of the second source voltage (battery voltage) and the upper limit value of the operation unsteady region of the microprocessor, the microprocessor is enforcedly reset. Therefore, the microprocessor can be freely actuated with any one of the main power source and the auxiliary power source, and the malfunction operation state of the microprocessor can be surely avoided with the simple and low-price construction. In addition, the convenience for the user can be improved.

What is claimed is:

1. A circuit for a microprocessor of the type having an unsteady operating region when the driving voltage falls below an upper limit value, and a normal operating region when the driving voltage is at least at an auxiliary operation voltage value, wherein the upper limit value is less than the auxiliary operation voltage value, said circuit being operable to prevent the microprocessor from operating in the unsteady region and comprising:

means for establishing a reference voltage value which is set between the auxiliary operation voltage value and the upper limit value; and reset means responsive to the value of the driving voltage for forcedly resetting the microprocessor when the value of the driving voltage of the microprocessor is reduced to the reference voltage value.

2. The circuit as in claim 1, wherein said reset means comprises a comparator having an output terminal which is connected to a reset terminal of the microprocessor and an input terminal which is supplied with a driving voltage from one of a main voltage source and an auxiliary voltage source, the auxiliary voltage source being actuated when the main voltage source is in the malfunction state, whereby the microprocessor driving voltage is compared with the reference voltage value so that a reset signal is provided to the reset terminal of the microprocessor on the basis of the comparison result.

3. The circuit as in claim 2, wherein said comparator provides a reset signal when the value of the driving voltage is below the reference voltage value, the microprocessor being reset in response to the reset signal.

* * * * *